(12) United States Patent
Tang et al.

(10) Patent No.: US 7,455,434 B2
(45) Date of Patent: Nov. 25, 2008

(54) OPTICAL APPARATUS WITH DUAL ILLUMINATING DEVICES

(75) Inventors: Hua Tang, Taichung (TW); Feng Zhao, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 41 days.

(21) Appl. No.: 11/765,071

(22) Filed: Jun. 19, 2007

(65) Prior Publication Data
US 2008/0239720 A1 Oct. 2, 2008

(30) Foreign Application Priority Data
Mar. 26, 2007 (TW) .............................. 96110423 A

(51) Int. Cl.
*F21V 9/10* (2006.01)

(52) U.S. Cl. .................. 362/419; 362/269; 362/285; 362/287; 362/319

(58) Field of Classification Search .............. 362/419, 362/269, 285, 287, 319, 322
See application file for complete search history.

(56) References Cited

U.S. PATENT DOCUMENTS

| 6,529,241 | B1 * | 3/2003 | Clark | 348/308 |
| 6,543,914 | B2 * | 4/2003 | Sander | 362/401 |
| 2004/0125437 | A1 * | 7/2004 | Schmidt et al. | 359/368 |

* cited by examiner

*Primary Examiner*—Anabel M Ton
(74) *Attorney, Agent, or Firm*—Thomas, Kayden, Horstemeyer & Risley

(57) ABSTRACT

An optical apparatus with dual illuminating devices includes a body, a first lighting device, a pivoting arm, an actuating pin, a switch and a second lighting device. The body has a joint portion. The first lighting device is mounted in the body. The pivoting arm has a first end and a second end. The first end is pivotally mounted on the joint portion so that the pivoting arm can be adjusted between a first position and a second position relative to the body. The second lighting device is mounted on the second end of the pivoting arm. Rotating the pivoting arm drives the actuating pin to press the switch, which turns off the second lighting device and turns simultaneously on the first lighting device.

15 Claims, 8 Drawing Sheets

OPTICAL APPARATUS WITH DUAL ILLUMINATING DEVICES

RELATED APPLICATIONS

The application claims priority to Taiwan Application Serial Number 96110423, filed Mar. 26, 2007, which is herein incorporated by reference.

BACKGROUND

1. Field of the Invention

The present invention relates to an optical apparatus. More particularly, the present invention relates to an optical apparatus with dual illuminating devices.

2. Description of Related Art

Refer to FIG. 1 and FIG. 2. An optical apparatus for observing objects in accordance with the prior art such as an optical microscope 500 comprises a body 510 and an illuminating device 520. The body 510 comprises an object stage 511 and a light hole 512. The light hole 512 is defined in the underside of the body 510 under the object stage 511.

The illuminating device 520 comprises a pivoting arm 521. The pivoting arm 521 has two ends through which one end is pivotally mounted on the body 510 and the other end suspends a lighting device 522. The lighting device 522 adopts a single light emitted diode (LED).

When the microscope 500 needs light illuminated from the upper side of the object stage 511, rotating the arm 521 relative to the body 510 enables the lighting device 522 to be suspended over the object stage 511 to illuminate objects on the object stage 511. Likewise, when the microscope 500 needs light illuminated from the underside of the object stage 511, rotating the arm 521 relative to the body 510 enables the lighting device 522 to be located under the object stage 511 to illuminate objects on the object stage 511 through the light hole 512.

However, the aforementioned lighting device 522 cannot provide sufficient illumination to meet the brightness requirements for observation when the lighting device 522 is located under the object stage 511 to illuminate objects on the object stage 511 through the light hole 512. The reason is that the light beams are transmitted into the body 510 though the light hole 512 from the outside of the object stage 511, and are transmitted from the underside of the body 510. It therefore provides weak illumination and cannot meet the brightness requirements for observation. Besides, underside illumination means that the body 510 of the microscope 500 needs to define the light hole 512. The light hole 512 not only influences the appearance of the entire microscope 500, but also results in unfavorable effects for preventing the optical lenses of the microscope 500 from dust.

Therefore, there is a need to provide an improved optical apparatus to mitigate or obviate the aforementioned problems.

SUMMARY

An object of the present invention is to provide an optical apparatus with dual illuminating devices that enable either the upper side or underside of the optical apparatus to be illuminated and have smooth switching manipulations to provide sufficient light beams for the optical apparatus.

An optical apparatus with dual illuminating devices in accordance with the present invention comprises a body, a first illuminating device, a second illuminating device, a limit switch and an activating pin. The body has a top and a joint portion. The joint portion has a limit switch groove. The limit switch groove is a semicircular groove and has a first limit portion and a second limit portion. The second limit portion is apart away from the first limit switch portion.

The first illuminating device is mounted in the body and comprises a first lighting device. The limit switch is mounted at the joint portion adjacent to the second limit portion and comprises an activator. The activator extends into the limit switch groove at the second limit portion to be pressed by the activating pin.

The second illuminating device comprises a pivoting arm and a second lighting device. The pivoting arm has a first end and a second end. The first end is pivotally mounted on the joint portion. The second lighting device is mounted on the second end whereby rotating the pivoting arm drives the second lighting device between a first position over the body and a second position underside the body. When the pivoting arm is rotated to drive the second lighting device from the first position to the second position, the activating pin is simultaneously driven sliding along the limit switch groove from the first limit portion to the second limit portion to touch the activator of the limit switch to simultaneously turn off the second lighting device and turn on the first lighting device.

The optical apparatus in accordance with the present invention alters the lighting devices to illuminate objects by rotating the pivoting arm. The optical apparatus adopts inside lighting device to directly illuminate the object stage from the inside of the object stage. The optical apparatus not only provides direct upper side and inside illumination to the object stage to enhance optical characteristics, but also avoids the need of the light hole, which renders the appearance of the entire optical apparatus beautiful and nice to look. The light beams emitted inside the optical apparatus illuminate the underside of the object stage, which simplifies optical designs of the apparatus.

Further, since the underside illumination of the object stage is provided by the light beams emitted inside the optical apparatus and is not provided by the external light beams, the present invention therefore has both dual illumination and meets the optical brightness requirements for clear object observation when the illumination is altered to the underside illumination. The structure of the apparatus is not complex, operation of the apparatus is smooth and observation effects are clear.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
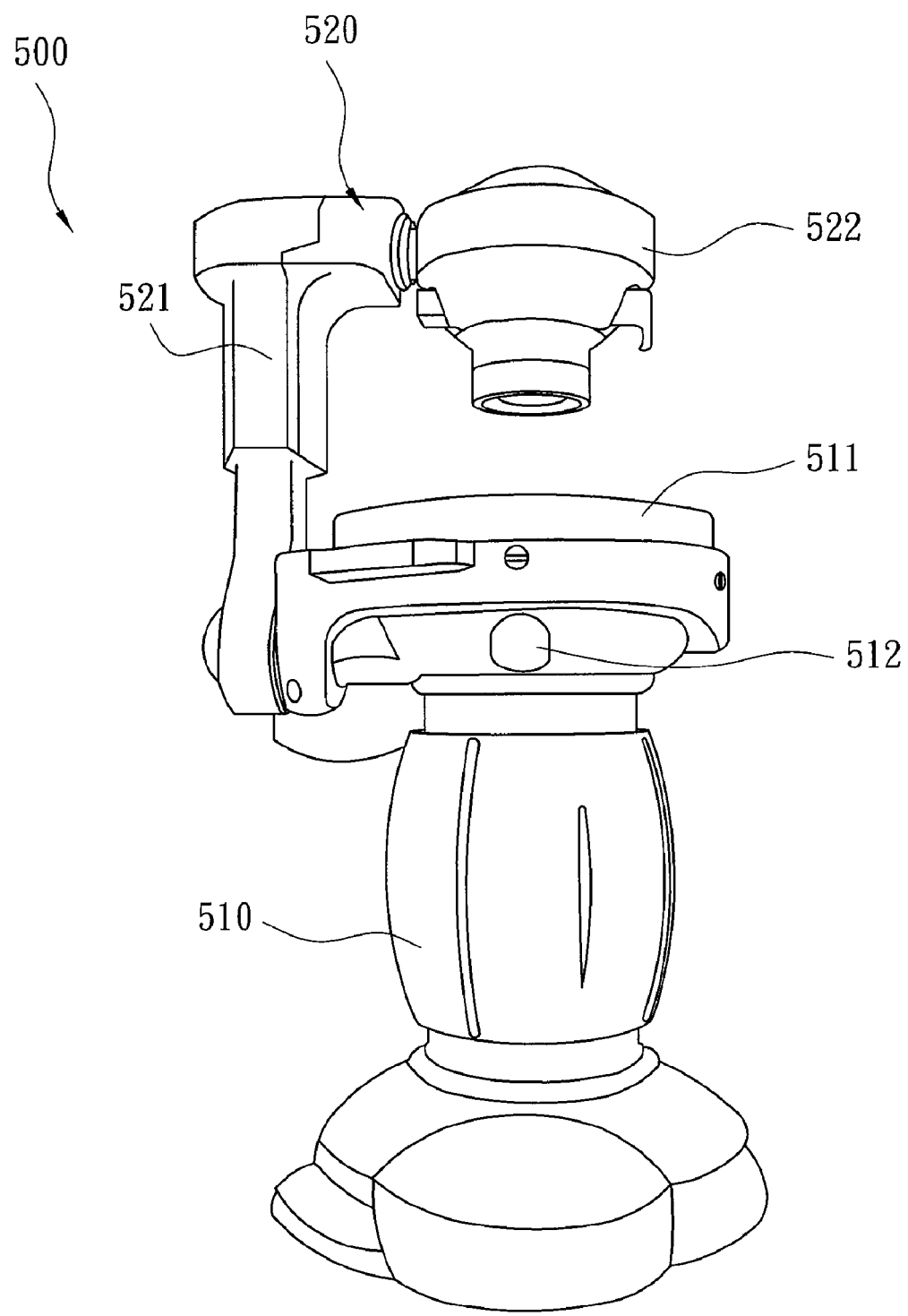
FIG. 1 is a perspective view of an optical apparatus with upper side illumination in accordance with the prior art.
Figure 2:
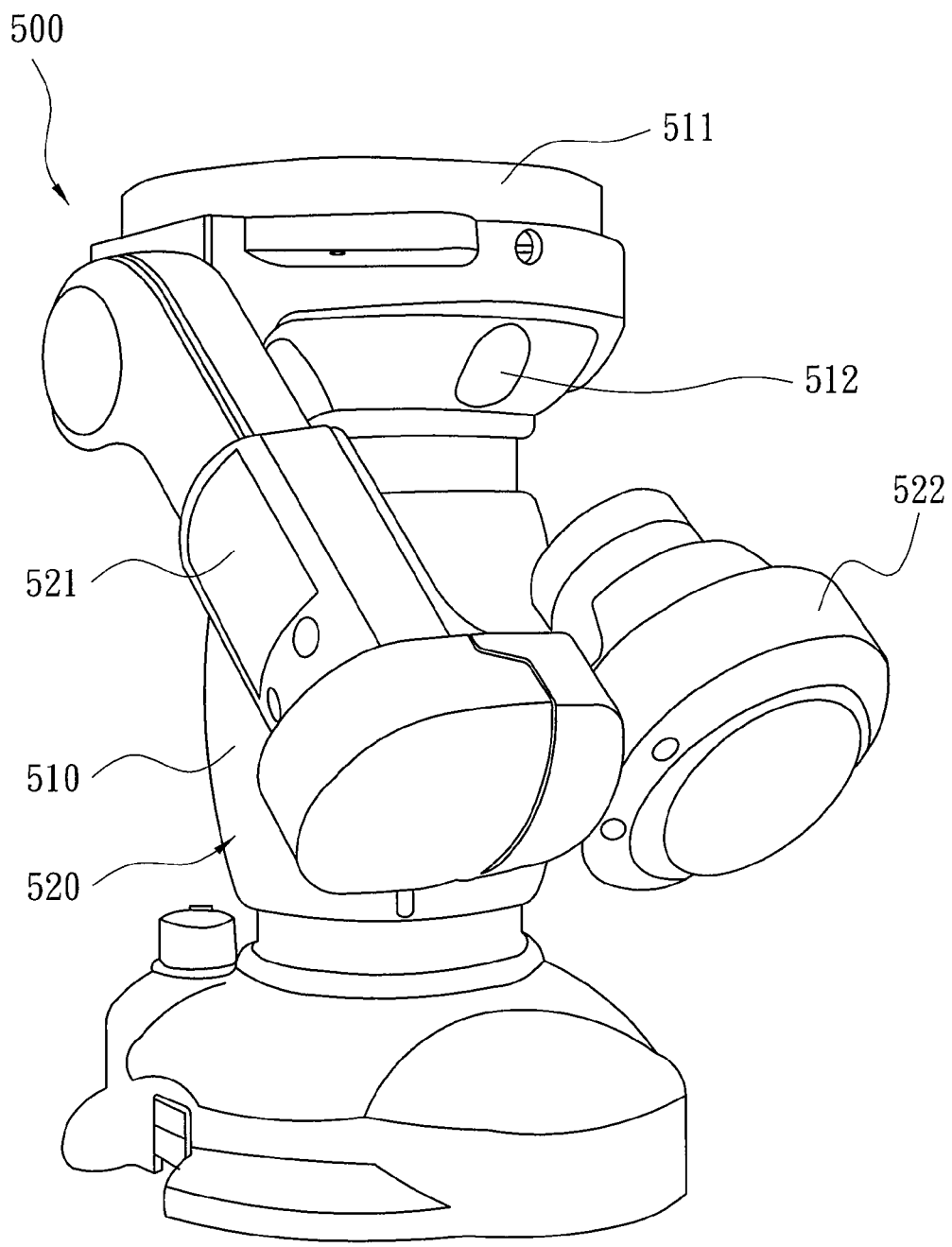
FIG. 2 is a perspective view of the optical apparatus in FIG. 1 when underside illumination is provided through a light hole.

Reference will now be made in detail to the present preferred embodiments of the invention, examples of which are illustrated in the accompanying drawings. Wherever possible, the same reference numbers are used in the drawings and the description to refer to the same or like parts.

An embodiment of an optical apparatus with dual illuminating devices in accordance with the present invention can have applications on illumination of electronic appliances, light and sound mechanisms of toys, gifts or cards, or even illuminating mechanisms for buildings. For convenient illustration, the embodiment illustrates an application on optical microscope as follows.

Figure 3:
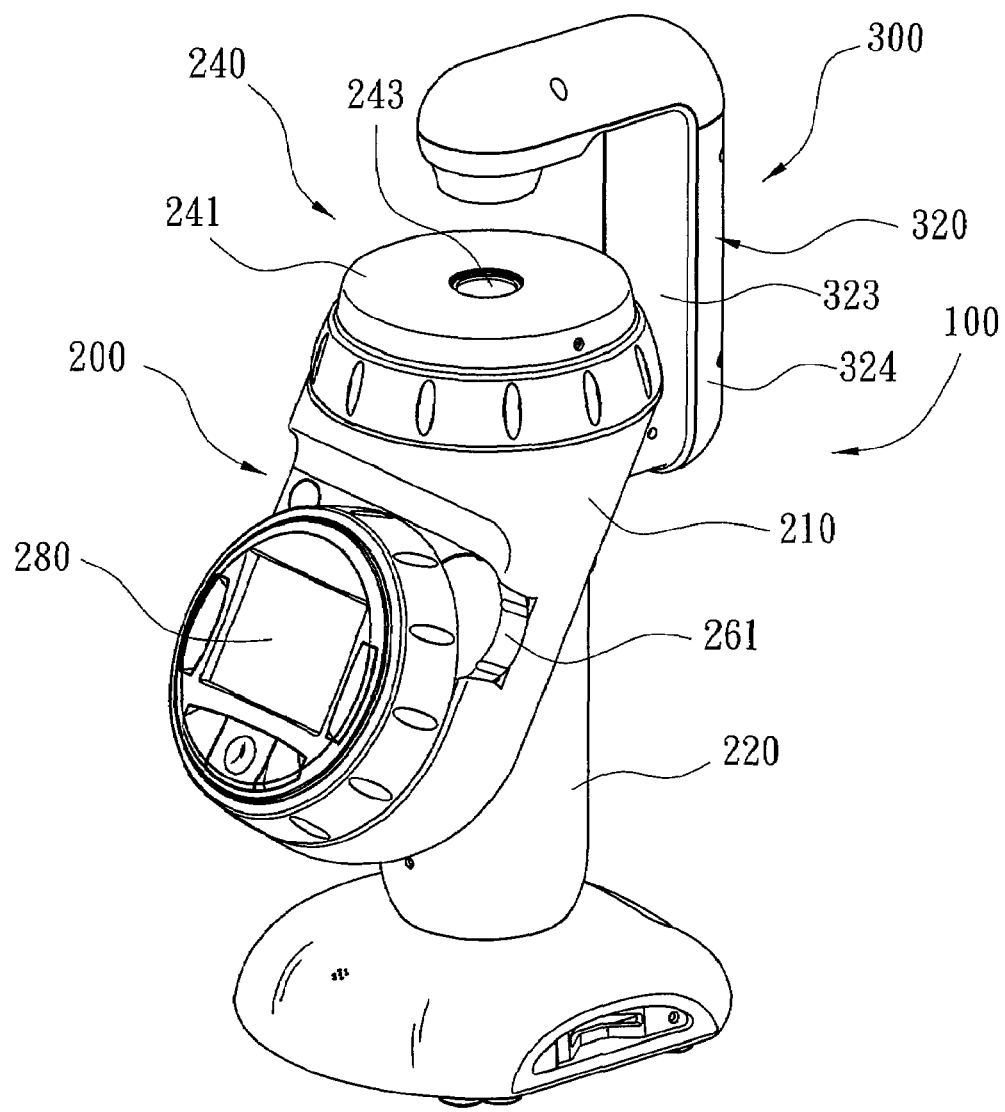
FIG. 3 is a perspective view of an optical apparatus with upper side illumination in accordance with the present invention when a pivoting arm is positioned in a first position.
Figure 4:
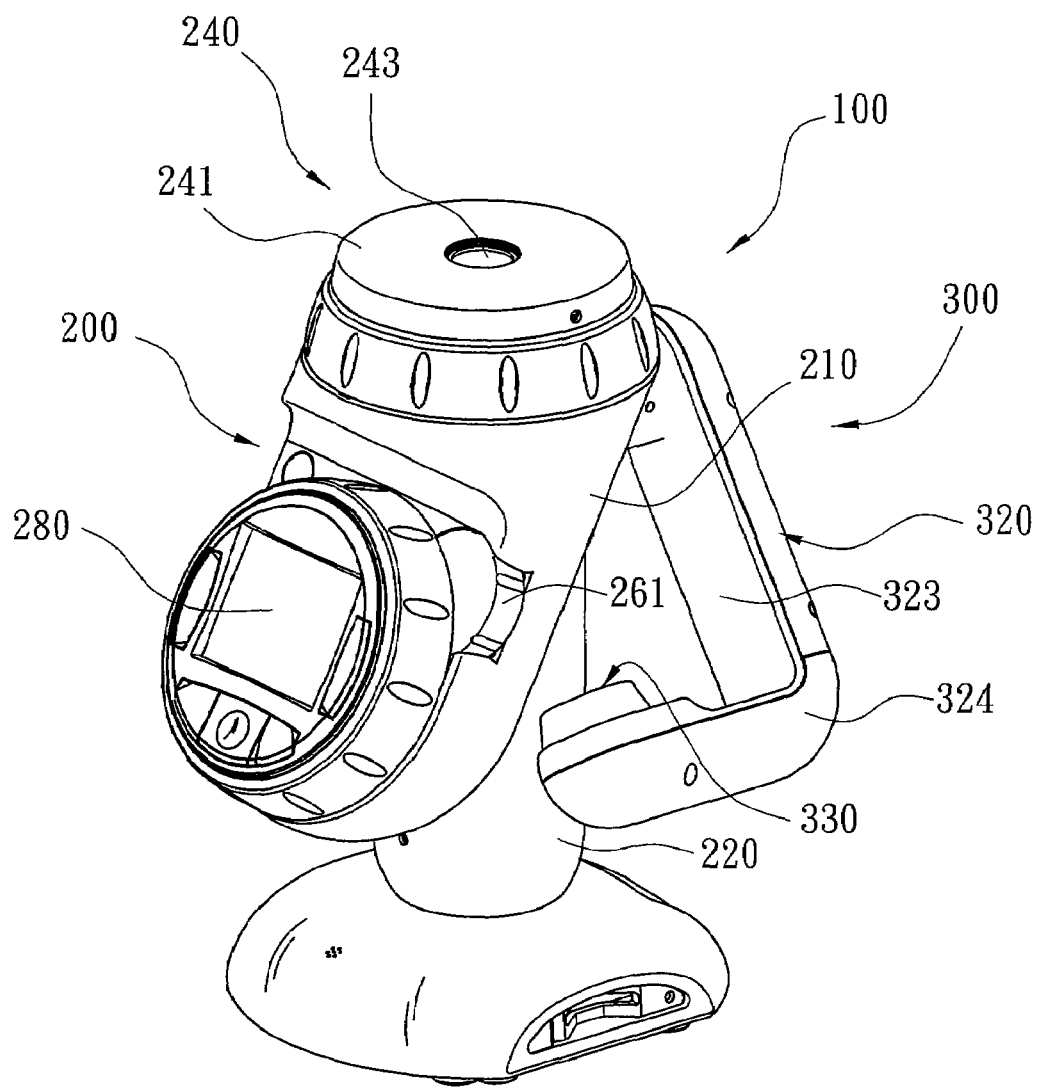
FIG. 4 is a perspective view of the optical apparatus with underside illumination when the pivoting arm is positioned in a second position.
Figure 5:
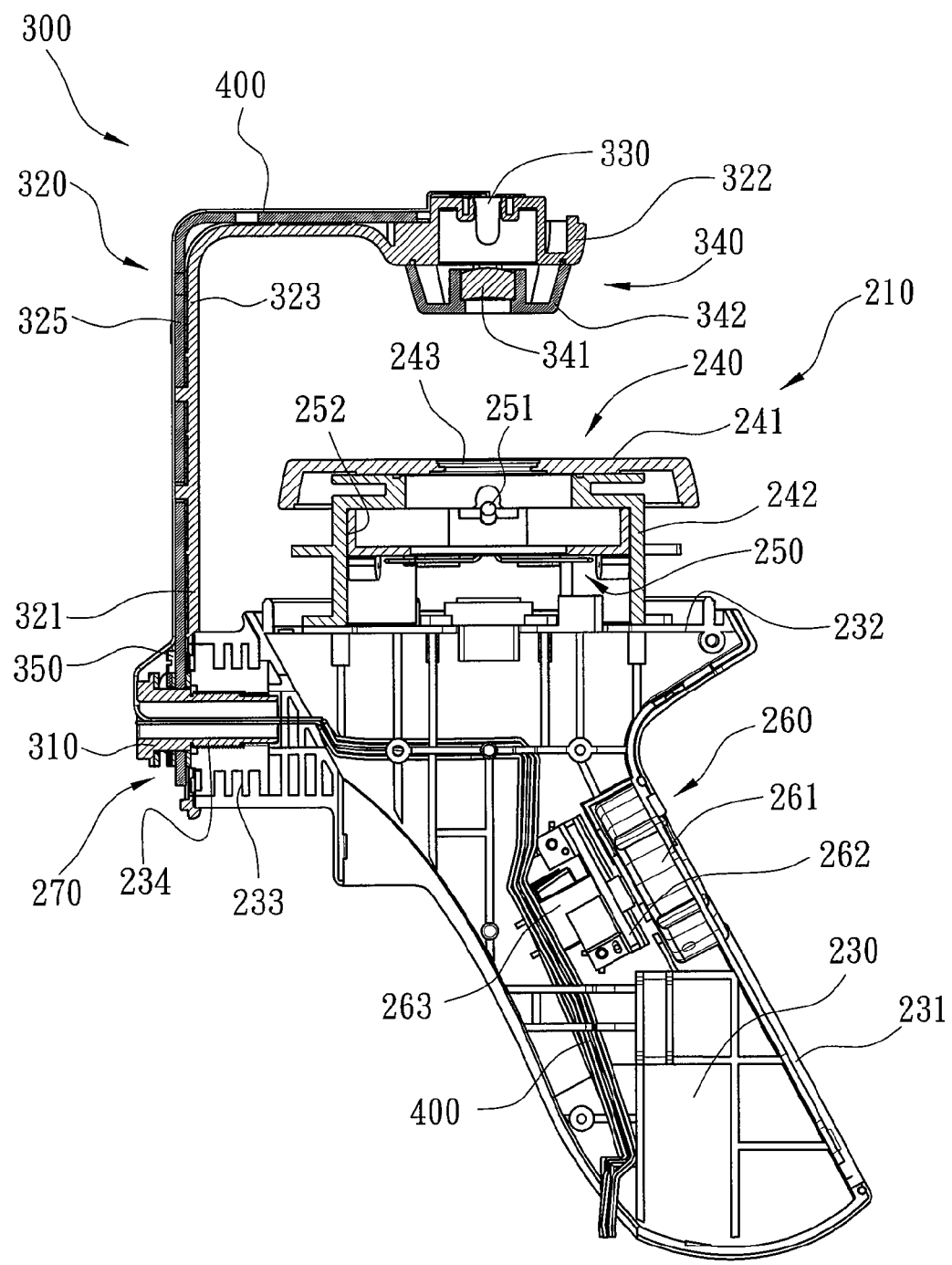
FIG. 5 is a section view of a portion of the optical apparatus in FIG. 3.

Refer to FIG. 3, FIG. 4 and FIG. 5. An embodiment of an optical microscope 100 with dual illuminating devices in accordance with the present invention comprises a body 200, a first illuminating device 250, a second illuminating device 300 and a display device 280. The body 200 comprises an upper portion 210 and a lower portion 220. The upper portion 210 is mounted on the lower portion 220 and comprises a casing 230, a stage device 240, an illumination-adjusting device 260 and a switch device 270. The display device 280 is mounted on the body 200 to display and show the operation and observation information.

Figure 6:
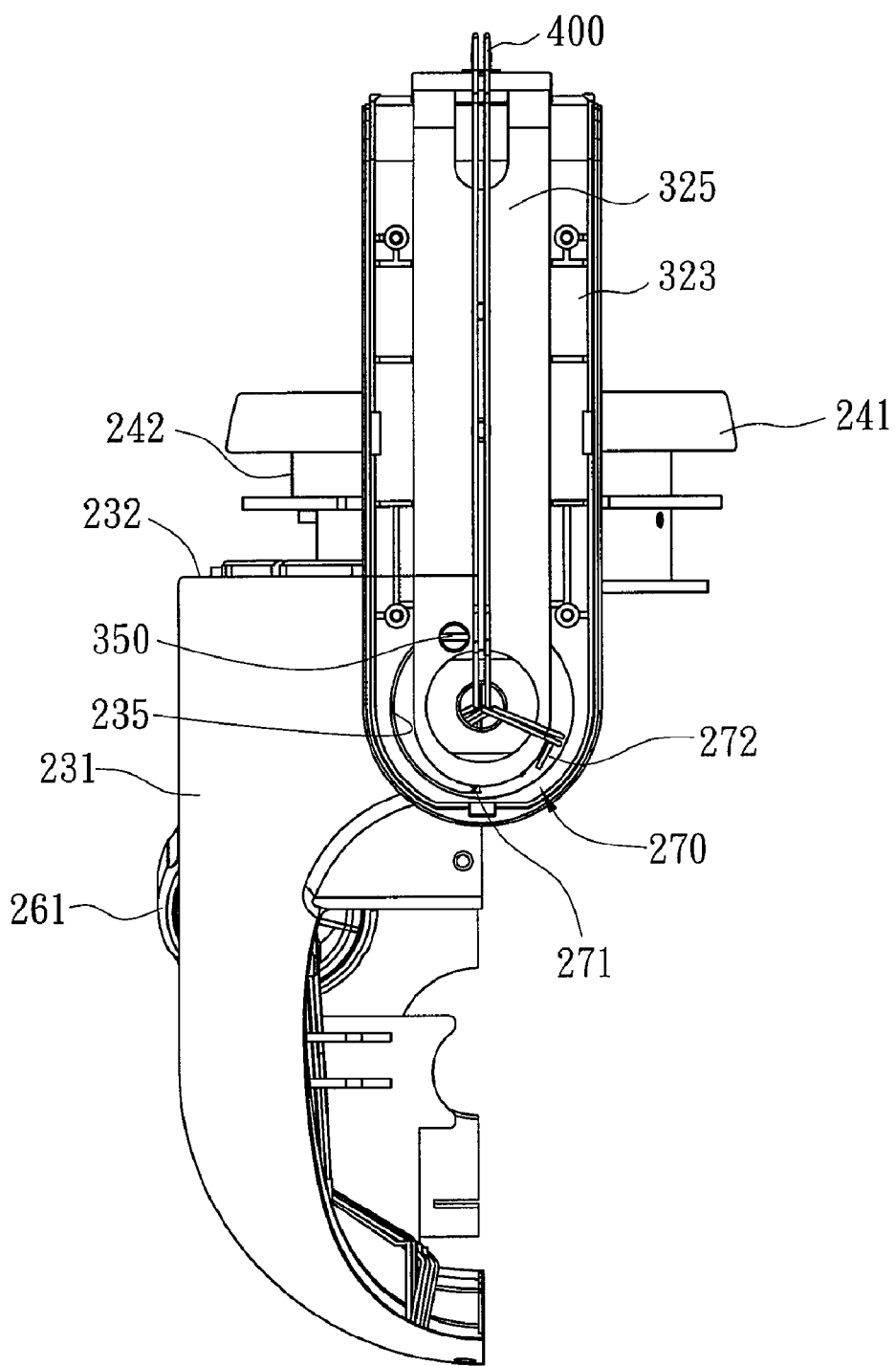
FIG. 6 is a side view of a portion of the optical apparatus in FIG. 3.
Figure 7:
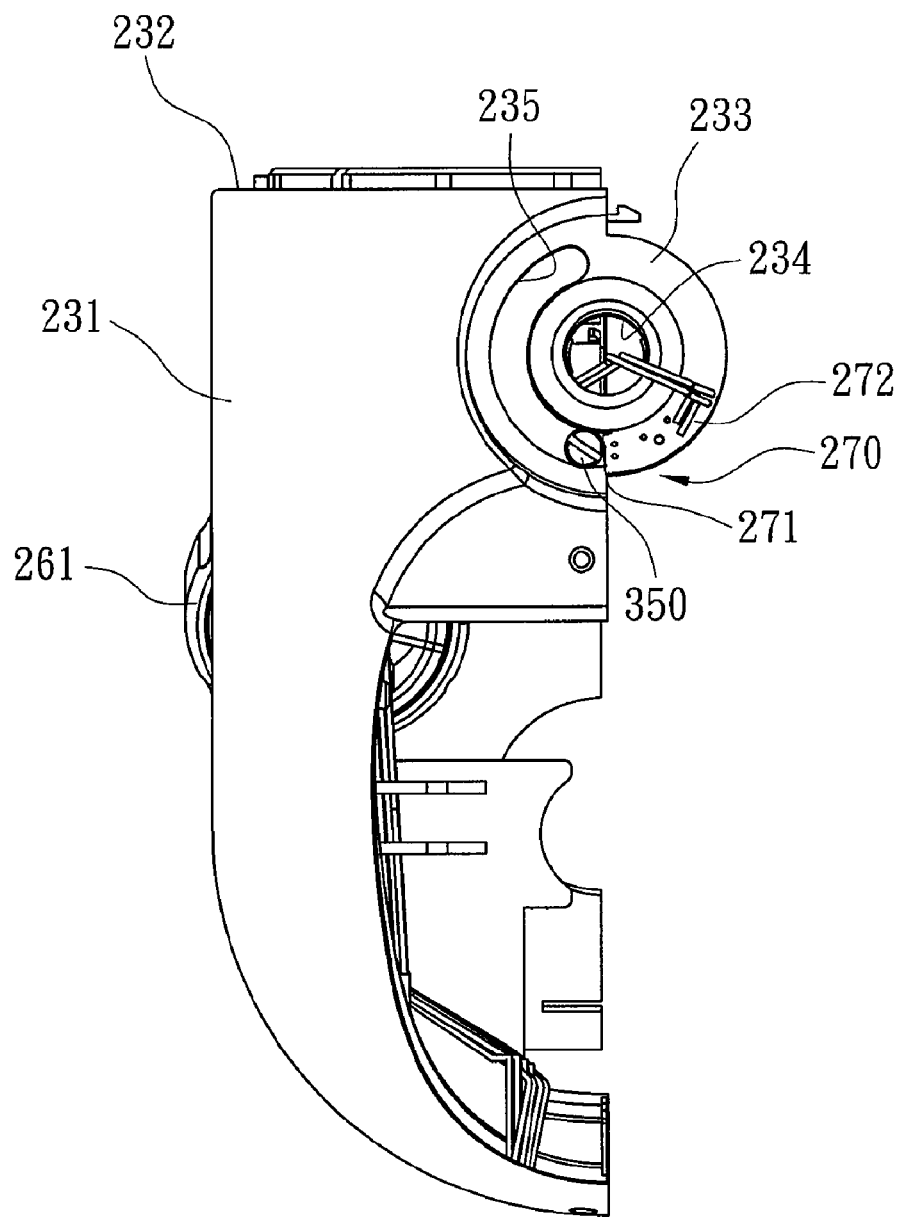
FIG. 7 is a side view of a portion of the optical apparatus in FIG. 3 with removing the pivoting arm.
Figure 8:
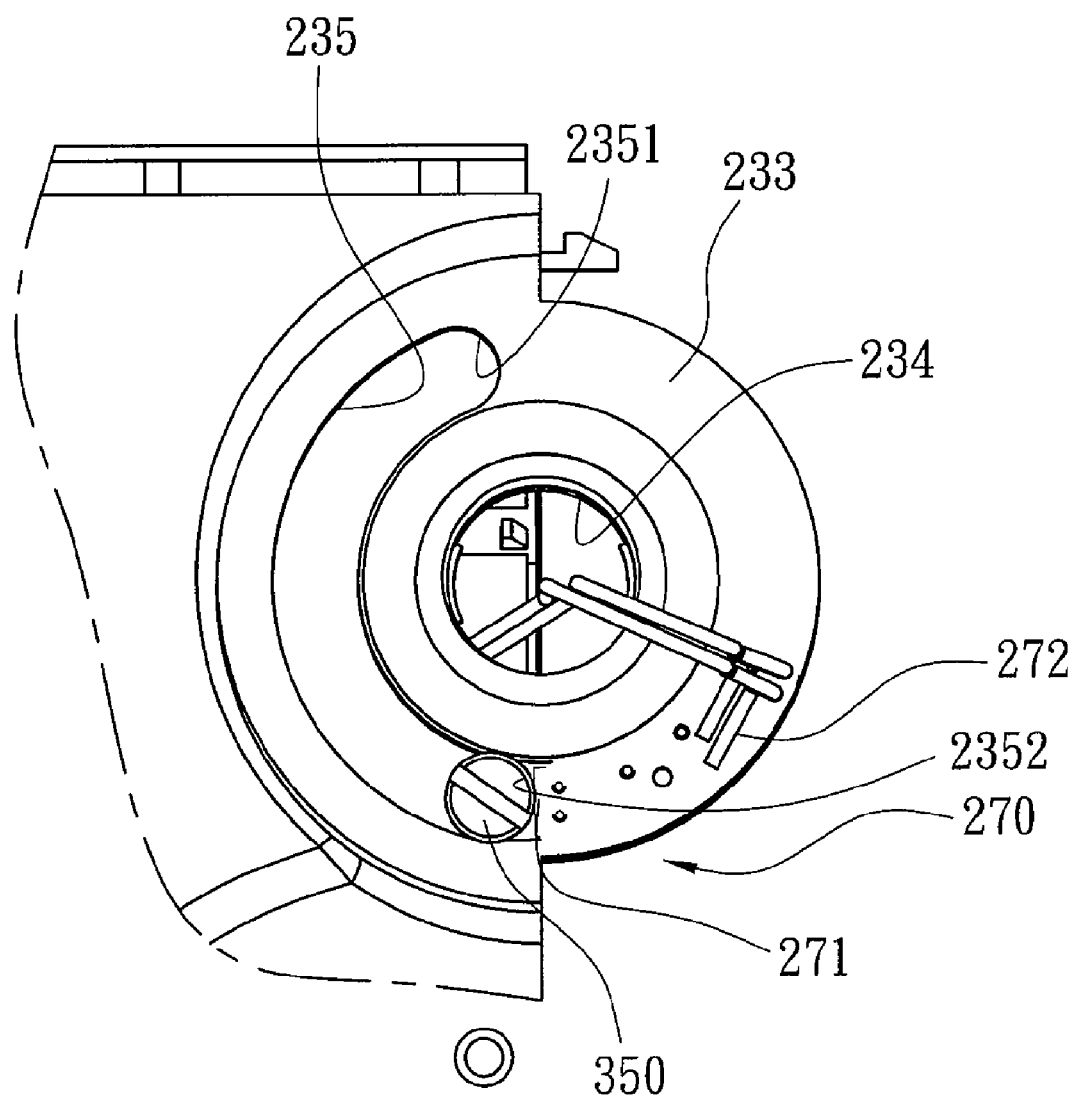
FIG. 8 is an enlarged side view of a portion of the optical apparatus in FIG. 3.

Further refer to FIG. 5, FIG. 6, FIG. 7 and FIG. 8. The casing 230 comprises two casing halves 231. The casing 230 has a top 232 and a joint portion 233. The joint portion 233 has a through hole 234 and a limit switch groove 235. The limit switch groove 235 is an elongated semicircular groove and has a first limit portion 2351 and a second limit portion 2352 as shown in FIG. 8. The switch device 270 is mounted in the joint portion 233 at the bottom of the limit switch groove 235 and comprises a limit switch 271 and a circuit board 272. The limit switch 271 is mounted on the circuit board 270 and has an activator extended into the limit switch groove 235 at the second limit portion 2352.

The stage device 240 is mounted on the top 232 of the casing 230 and comprises an object stage 241 and a stage holder 242. The stage holder 242 is mounted on the top 232 of the casing 230. The object stage 241 is mounted on the stage holder 242 and has an observation hole 243. In the embodiment, the observation hole 234 is defined in the center of the object stage 241.

The first illuminating device 250 is mounted in the body 200. In the embodiment, the first illuminating device 250 is mounted in the casing 230 and is held by the stage holder 242. The first illuminating device 250 comprises a first lighting device 251 and a lighting device holder 252. The lighting device holder 252 is mounted on the stage holder 242. In the embodiment, the first lighting device 251 comprises three light emitting diodes (LEDs) that are mounted around the observation hole 243 and are equidistantly arranged under the object stage 241.

Further refer to FIG. 4 and FIG. 5. The illumination-adjusting device 260 is mounted on the casing 230 and comprises an adjusting knob 261, a knob holder 262 and a potentiometer 263. The knob holder 262 and the potentiometer 263 are mounted in the casing 230. The potentiometer 263 electrically connects to the first lighting device 251 by means of wires 400. The adjusting knob 261 connects to the potentiometer 263 and is exposed outside the casing 230. Therefore, rotating the adjusting knob 261 tunes the potentiometer 263 to adjust the brightness of the first lighting device 251.

The second illuminating device 300 is pivotally mounted on the joint portion 233 of the casing 230 and comprises a rotating shaft 310, a pivoting arm 320, a second lighting device 330, a lens device 340 and an activating pin 350.

The rotating shaft 310 is a hollow shaft and is partially mounted and held in the joint portion 233 of the casing 230. The wires 400 pass through the rotating shaft 310 so as to electrically connect the potentiometer 263 to the second lighting device 330. Likewise, rotating the adjusting knob 261 can also tune the potentiometer 263 to adjust the brightness of the second lighting device 330.

The pivoting arm 320 is an L-shaped arm and has a first end 321 and a second end 322. The first end 321 is connected to the rotating shaft 310 through which the pivoting arm 320 can be rotated relative to the body 200 between a first position (as shown in FIG. 3) and a second position (as shown in FIG. 4) to adjust its position. When the pivoting arm 320 is rotated to its first position, the second end 322 is positioned over the observation hole 243 of the object stage 241.

Further refer to FIG. 6. The pivoting arm 320 comprises a first housing 323, a second housing 324 and an arm brace 325. The first housing 323 combines with the second housing 324. The arm brace 325 is mounted in the first housing 323 and the second housing 324 onto which the wires 400 are attached. Hence, the wires 400 do not interfere with the adjustment of the pivoting arm 320, which provides smooth operation and adjustment for the pivoting arm 320.

The second lighting device 330 is mounted at the second end 322 of the pivoting arm 320. When the pivoting arm 320 is rotated to its first position, the second lighting device 330 is positioned over the observation hole 243 of the object stage 241 to illuminate. In the embodiment, the second lighting device 330 comprises an LED.

The lens device 340 is mounted around the second lighting device 330. When the second lighting device 330 is positioned over the observation hole 243 of the object stage 241, the lens device 340 is located between the second lighting device 330 and the object stage 241. The lens device 340 comprises a lens 341 and a lens holder 342. The lens holder 342 is mounted at the second end 322 of the pivoting arm 320 and holds the lens 341 at the second end 322. The lens 341 is a diffusing lens to diffuse light beams emitted from the second lighting device 330 and project the light beams on the object stage 241. When the power is turned on, rotating the adjusting knob 261 turns on the second lighting device 261 to illuminate objects on the object stage 241 for observation.

Refer to FIG. 6, FIG. 7 and FIG. 8. The activating pin 350 is mounted on the pivoting arm 320 and is slidably held in the limit switch groove 235. When the pivoting arm 320 is rotated relative to the body 200, the activating pin 350 slides simultaneously along the limit switch groove 235. In the embodiment, the activating pin 350 is secured on the arm brace 325 and is moved in accordance with the rotated arm brace 325. The activating pin 350 slides in the limit switch groove 235 between the first limit portion 2351 and the second limit portion 2352. When the pivoting arm 320 is rotated from its first position to the second position, the activating pin 350 slides simultaneously along the limit switch groove 235 from the first limit portion 2351 to the second limit portion 2352 to press the activator of the limit switch 271. In the embodiment, the pivoting arm 320 is rotated about 145 degrees between its two positions. When the activating pin 350 presses the activator of the limit switch 271, the second lighting device 330 is turned off while the first lighting device 251 is simultaneously turned on. Light beams emitted by the first light device 251 directly illuminate the object stage 241 from its underside so that observing objects on the object stage 241 with underside illumination through the observation hole 243 is accomplished.

According to aforementioned embodiment, applying the present invention has some advantages as follows.

The optical apparatus in accordance with the present invention alters the lighting devices to illuminate objects by rotating the pivoting arm. The optical apparatus provides inside lighting device to directly illuminate the object stage from the inside of the object stage. The optical apparatus not only provides direct upper side and inside illumination to the object stage to enhance optical characteristics, but also avoids the need of the light hole, which renders the appearance of the entire optical apparatus beautiful and nice to look. Light beams emitted from the inside of the optical apparatus illuminate the underside of the object stage, which simplifies optical designs of the apparatus.

Further, since the underside illumination of the object stage is provided by the light beams emitted inside the optical apparatus and is not provided by the outside light beams, the present invention not only has dual illuminations but also meets the requirements of optical brightness to clarify observation of the object when the illumination is altered to the underside illumination. The structure of the apparatus is not complex, operations of the apparatus are smooth and observation effects are clear.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical apparatus with dual illuminating devices, and the optical apparatus comprising
    a body having a top and a joint portion, the joint portion having a limit switch groove, and the limit switch groove having a first limit portion and a second limit portion apart away from the first limit portion;
    a first illuminating device mounted in the body and comprising a first lighting device;
    a second illuminating device comprising a pivoting arm and a second lighting device, the pivoting arm having a first end and a second end, and the first end pivotally mounted on the joint portion, and the second lighting device mounted on the second end whereby rotating the pivoting arm moves the second lighting device between a first position over the body and a second position underside the body;
    a limit switch mounted at the joint portion and comprising an activator extended into the limit switch groove at the second limit portion; and
    an activating pin mounted on the pivoting arm at the joint portion, extended into the limit switch groove and being movable between the first limit portion and the second limit portion;
    whereby when the rotating arm drives the second lighting device from the first position to the second position, the activating pin is simultaneously driven sliding along the limit switch groove from the first limit portion to the second limit portion to touch the activator of the limit switch to simultaneously turn off the second lighting device and turn on the first lighting device.

2. The optical apparatus as claimed in claim 1, further comprising an object stage mounted on the top of the body and having an observation hole, wherein the first lighting device is mounted under the object stage.

3. The optical apparatus as claimed in claim 1, wherein the first lighting device and the second lighting device comprise respectively at least one light emitting diode.

4. The optical apparatus as claimed in claim 1, further comprising an illumination-adjusting device mounted in the body and the illumination-adjusting device comprising
    a potentiometer electrically connected to the first lighting device and the second lighting device; and
    an adjusting knob electrically connected to the potentiometer to adjust the brightness of the first lighting device and the second lighting device.

5. The optical apparatus as claimed in claim 2, further comprising a stage holder mounted on the top of the body where the stage holder holds the object stage.

6. The optical apparatus as claimed in claim 5, wherein the first illuminating device is mounted on the stage holder.

7. The optical apparatus as claimed in claim 3, wherein the first lighting device comprises three light emitting diodes.

8. The optical apparatus as claimed in claim 1, further comprising a lens device mounted around the second lighting device and the lens device comprising
    a lens holder mounted at the second end of the pivoting arm; and
    a diffusing lens mounted on the lens holder.

9. The optical apparatus as claimed in claim 1, further comprising a rotating shaft being a hollow shaft, wherein the joint portion further has a through hole in which the rotating shaft is partially and rotatably held, and the pivoting arm is connected to the rotating shaft whereby the pivoting arm is rotated relative to the body through the rotating shaft.

10. The optical apparatus as claimed in claim 1, wherein the pivoting arm is L-shaped.

11. The optical apparatus as claimed in claim 1, the first position and the second position of the pivoting arm has an angle, and the angle is about 145 degrees.

12. The optical apparatus as claimed in claim 1, wherein the limit switch groove is a semicircular groove.

13. The optical apparatus as claimed in claim 1, further comprising a circuit board mounted on the joint portion adjacent to the second limit portion, and the limit switch is mounted on the circuit board.

14. The optical apparatus as claimed in claim 1, wherein the pivoting arm comprises
    a first housing;
    a second housing combined with the first housing; and
    an arm brace mounted in the first housing and the second housing;
    wherein the activating pin at the joint portion is secured on the arm brace and rotating with the arm brace.

15. The optical apparatus as claimed in claim 1, further comprising a display device mounted on the body.

* * * * *